United States Patent
Wolgram et al.

(10) Patent No.: US 9,409,271 B2
(45) Date of Patent: Aug. 9, 2016

(54) COOLANT DISTRIBUTOR FOR A MACHINE TOOL

(71) Applicant: WALTER MASCHINENBAU GMBH, Tuebingen (DE)

(72) Inventors: Stefan Wolgram, Grafenberg (DE); Wolfgang Nuber, Rottenburg (DE)

(73) Assignee: WALTER MASCHINENBAU GMBH, Tuebingen (DE)

( * ) Notice: Subject to any disclaimer, the term of this patent is extended or adjusted under 35 U.S.C. 154(b) by 35 days.

(21) Appl. No.: 14/401,038

(22) PCT Filed: May 16, 2013

(86) PCT No.: PCT/EP2013/060130
§ 371 (c)(1),
(2) Date: Nov. 13, 2014

(87) PCT Pub. No.: WO2013/171298
PCT Pub. Date: Nov. 21, 2013

(65) Prior Publication Data
US 2015/0151397 A1    Jun. 4, 2015

(30) Foreign Application Priority Data
May 16, 2012   (DE) .......................... 10 2012 104 263

(51) Int. Cl.
*B24B 55/00*    (2006.01)
*B23Q 11/10*    (2006.01)
*B24B 55/03*    (2006.01)

(52) U.S. Cl.
CPC ........ *B23Q 11/1084* (2013.01); *B23Q 11/1076* (2013.01); *B24B 55/03* (2013.01); *Y10T 137/9029* (2015.04)

(58) Field of Classification Search
CPC .............. B24B 55/03; B23Q 11/1084; B23Q 11/1076; Y10T 137/9029; Y10T 137/5109; Y10T 409/304032; Y10T 409/303976; Y10T 408/44; Y10T 408/45; Y10T 408/453; Y10T 408/455; Y10T 408/46

USPC .......................... 451/7, 60, 446; 408/56–61; 409/135–136
See application file for complete search history.

(56) References Cited

U.S. PATENT DOCUMENTS 2,335,100 A * 11/1943 Bauer .................... B23Q 11/10
                                                          165/254
2,403,546 A *  7/1946 Olsen ..................... B24B 33/06
                                                          33/543.1

(Continued)

FOREIGN PATENT DOCUMENTS

CN         101204791 A      6/2008
CN         101959661 A      1/2011

(Continued)

OTHER PUBLICATIONS

International Search Report for corresponding PCT/EP2013/060130, dated Jun. 28, 2013.

(Continued)

*Primary Examiner* — George Nguyen
(74) *Attorney, Agent, or Firm* — Fitch, Even, Tabin & Flannery LLP (57) ABSTRACT

A coolant distributor (10) includes a rigid connection unit (17) installed to be movable relative to the machine frame. An exchangeable distributor unit (18) can be connected to or disconnected from the connection unit (17) via a gripper device associated with the machine tool. The connection unit (17) has a connection face, on which at least one coolant supply channel opens. A distributor face on the distributor unit (18), where at least one distributor channel opens, contacts the connector face. The plane in which the connection face extends and the plane in which the distributor face extends are tilted from a connection direction (R) in which the distributor unit (18) moves to make and break the connection. A retaining force can be applied in the connection direction (R) by a locking device to retain the distributor unit in the connected position.

15 Claims, 9 Drawing Sheets

(56) References Cited

U.S. PATENT DOCUMENTS

| | | | | |
|---|---|---|---|---|
| 2,929,566 | A | * | 3/1960 | Paasche ............ B23Q 11/1084 239/273 |
| 3,104,826 | A | * | 9/1963 | Morris ................. B05B 7/0433 239/413 |
| 3,547,350 | A | * | 12/1970 | Marcoux ........... B23Q 11/1084 239/308 |
| 3,745,716 | A | * | 7/1973 | Turner ................. B24B 19/028 451/226 |
| 4,006,861 | A | | 2/1977 | Alger et al. |
| 4,236,356 | A | * | 12/1980 | Ward ................... B23D 45/165 125/13.01 |
| 4,392,334 | A | * | 7/1983 | Tusinski ................ B24B 55/02 451/446 |
| 4,862,991 | A | | 9/1989 | Hoyle et al. |
| 5,265,505 | A | * | 11/1993 | Frechette ............ B23Q 1/0018 29/39 |
| 6,126,526 | A | | 10/2000 | Herrscher et al. |
| 7,931,427 | B1 | * | 4/2011 | McArthur .......... B23Q 11/1084 408/61 |
| 2004/0118457 | A1 | * | 6/2004 | Sugata ................ B23Q 39/023 137/434 |
| 2008/0145164 | A1 | | 6/2008 | Hackman |
| 2011/0005729 | A1 | | 1/2011 | Stemke |
| 2011/0182687 | A1 | | 7/2011 | Munz |
| 2011/0318123 | A1 | * | 12/2011 | Leishman ............. B23Q 11/10 408/1 R |

FOREIGN PATENT DOCUMENTS

| | | |
|---|---|---|
| DE | 19844242 C2 | 9/2000 |
| DE | 102009048018 A1 | 4/2011 |
| DE | 102010038145 A1 | 4/2011 |
| WO | 2011038813 A1 | 4/2011 |

OTHER PUBLICATIONS

Office Action and Search Report in corresponding Chinese Application No. 20138002532.9, dated Jan. 15, 2016, 16 pages.

* cited by examiner

COOLANT DISTRIBUTOR FOR A MACHINE TOOL

CROSS REFERENCE TO RELATED APPLICATIONS

This patent application is the national phase of PCT/EP2013/060130 filed May 16, 2013, which claims the benefit of German Patent Application No. DE 102012104263.2 filed May 16, 2012.

TECHNICAL FIELD

The invention relates to a coolant distributor for a machine tool.

BACKGROUND

The machine tool may be, for example, a grinding machine, an erosion machine, a milling machine, combinations of said machine tools or even machining centers. The coolant distributor is disposed to move the coolant provided in the machine tool to the site or sites at which the machine tool is in engagement with the workpiece or at which cooling is required.

In machine tools comprising an automatic tool change, a re-adjustment of the coolant distribution may be necessary. The reason for this is that the size of the tools is not the same and that, therefore, the point of engagement between the tool and the workpiece is no longer in the same position.

In order to solve this problem it has been known from DE 198 44 242 C2, for example, to exchange a coolant distributor unit adapted to the tool together with the tool. To accomplish this, the coolant distributor unit is connected to the tool. The coolant distributor unit comprises a nipple that can be plugged into an insertion opening of a supply channel. The insertion direction of the nipple in the opening corresponds to the insertion direction of the tool spindle in the spindle receptacle. In doing so, when pretensioning the tool, a sealing connection between the nipple of the coolant distributor unit and the opening of the supply channel is to be achieved.

In this known coolant distributor, in particular at high pressures of up to 50 bar, sealing problems between the nipple and the insertion opening on the supply channel may occur. Document DE 198 44 242 C2 does not indicate how exactly a mechanical and, at the same time, fluid-tight connection can be established between the nipple and the insertion opening.

SUMMARY

Therefore, the object of the present invention may be viewed to be the provision of an improved coolant distributor.

The coolant distributor according to the invention comprises a rigid connection unit with a connection face on which at least one supply channel for coolant opens. This connection unit is intended and designed for the stationary attachment to the machine frame. Connecting tubes for the supply of coolant are preferably non-detachably connected to the connection unit, for example, by being welded thereto. Furthermore, a guide arrangement is provided on the connection unit, said guide arrangement having at least one abutment surface that extends so as to be inclined at an angle of inclination relative to the connection face.

Furthermore, the coolant distributor comprises an exchangeable distributor unit. During a tool change, the distributor unit can be connected to or disconnected from the connection unit by means of a gripper device. The gripper device comprises a distributor face on which at least one distributor channel opens. With the connection between the connection unit the distributor unit established, there exists a fluidic connection between the supply channel and the distributor channel. The distributor unit comprises a counter-abutment surface associated with the abutment surface of the connection unit. The counter-abutment surface is inclined relative to the distributor face at the angle of inclination. The distributor unit can be moved in a connection direction parallel to the abutment surface, relative to the connection unit. During this movement, the counter-abutment surface slides along the abutment surface. In doing so, the distance between the distributor face and the connection face changes due to the angle of inclination, or the force of the pressure with which the distributor face is pressed against the connector face changes. In this manner, it is possible to achieve a fluid-tight coupling between the at least one distributor channel in the distributor unit and the respectively associate supply channel in the connection unit due to the wedge action achieved by the angle of inclination. At the same time, a mechanical connection is also established between the distributor unit and the connection unit.

With the use of the coolant distributor according to the invention, a fluid-tight connection between an exchangeable distributor unit and a connection unit on the side of the machine frame can be established in a simple manner. In doing so, the mechanical or fluidic connection is not a function of the manner of how and with what force the tool is received and supported in a tool receptacle of the machine tool. The distributor unit can be exchanged separately or also as a unit together with the associate machine tool. Via the connection face or the distributor face it is very easily possible to also provide several fluid lines that are fluidically separated from each other. For example, there may be two, three or more supply channels, in which case each supply channel is allocated a distributor channel. It is possible to supply the coolant at pressures of different levels, e.g., 20 and 40 bar, in the supply channels. The high coolant pressure can be used, for example, for rinsing coolant out of the tool, and the low coolant pressure can be used for cooling the site(s) to be cooled during operation. When a retaining force is applied to the connection unit in connection direction, the inclined connection face and the abutting inclined distributor face are pressed against each other. The force or the pressure with which the distributor face is pressed against the connection face can be prespecified in a highly accurate manner as required.

In a preferred embodiment the connection unit comprises a base body and a connection body that is arranged on the base body so as to be movable in particular at a right angle relative to the connection face. The connection face is provided on the connection body. The connection body may have a plate-like shape and be thus also referred to as the connection plate. At least one yielding element may be provided between the base body and the connection body. When the distributor face is pressed against the connection face, the at least one yielding element is elastically deformed. Due to this embodiment, it is ensured—with the connection established between the distributor unit and the connection unit—that any automatic escapement or blocking is prevented. Minimal movability of the connection body relative to the base body ensures that the mechanical connection between the distributor unit and the connection unit can be easily released again.

At the same time, the at least one yielding element between the connection body and the base body may act as a sealing element. Inasmuch as the connection face is provided on the connection body, a section of the supply channel extents in the connection body, while another section is provided in the base body. The yielding element tightly seals the connection site between these two sections of the supply channel. For example, a sealing ring or an O-ring may be used as the yielding element. For example, the yielding element consists of plastic material or of steel, or of another oil-resistant material. For example, nitrile rubber (NBR) may be used as the material for the yielding element.

Furthermore, it is advantageous if an annular step is formed between the section of the supply channel extending in the base body and the section of the supply channel extending in the connection body. Via this annular step, the coolant pressure prevailing in the distributor channel or in the supply channel can be used to press the connection body and thus the connection face against the distributor face. As a result of this, the seal of the fluidic connection between the connection unit and the distributor unit can be further improved.

The guide arrangement provided on the connection unit may comprise two guide rails extending parallel to each other in connection direction. In particular, the guide rails are arranged on opposite sides of the connection face. The distributor unit can be released in connection direction between the two guide rails for establishing or separating a connection in a very simple manner.

In doing so, each of the guide rails may have an abutment surface. The abutment surfaces may face the connection face, whereby the distance between the abutment surfaces and the connection face of the connection unit decreases—viewed from one insertion side, thus creating the angle of inclination between the two abutment surfaces and the connection face.

Preferably, the guide rails are detachable mounted to an associate base of the connection unit. Preferably, the guide rails are made of a material that is different from that of the connection body and/or the base body of the connection unit. In particular, the guide rails are of a material exhibiting good sliding properties such as brass, copper, plastic or the like. Preferably, the connection body consists of steel.

The connection face may have several surface sections that are at a distance from each other. In a preferred exemplary embodiment, the connection face is provided on at least one annular sealing edge. Each supply channel is completely enclosed by an associate annularly closed sealing edge. Therefore, the connection face is provided directly adjoining the supply channels and is dimensionally relatively small. Therefore, the pressure between the connection face and the distributor face becomes high at a prespecified pressing force, and the seal of the fluidic connection between the connection unit and the distributor unit is further improved.

In order to maintain the force of pressure between the distributor face and the connection face with the mechanical and fluid connection established, there preferably is provided a locking device. In locked position, the locking device prevents a movement of the distributor unit relative to the connector unit. Consequently, the fluid-tight connection is maintained in the locked state, and the pressing force between the distributor face and the connection face does not change. The pressing force between the connection face and the distributor face can continue to be maintained in this manner, without requiring any additional force and energy.

In one exemplary embodiment, the locking device comprises an actuation unit having at least one locking element, said actuation unit being coupled with the connection unit. The locking element can be slidably supported between a locked position and an unlocked position.

Preferably, the at least one locking element is pretensioned by a pretensioning force of a pretensioning element. Due to this pretensioning force the locking element is forced into its locked position. In one exemplary embodiment, two locking elements are provided, wherein the two locking elements may be associated with the same pretensioning element. The direction of movement of the at least one locking element between the locked position and the unlocked position is preferably transverse and, in particular, at a right angle relative to the connection direction. The force necessary for maintaining the locked position may be different—in this manner—from the force which is applied to the distributor unit in connection direction.

Each locking element may comprise an actuation member for moving the locking element between the locked position and the unlocked position. In particular, each actuation member projects from the housing of the actuation unit. Two locking elements with two actuation members may be provided, in which case the actuation members project from opposite sides of the housing of the actuation unit. In this arrangement, the actuation members can be actuated very simply by a gripper device provided for exchanging the tool and/or the distributor unit in order to switch the locking device between its locked state and its unlocked state.

Preferably at the same time, the at least one actuation member of the locking device, is also disposed for gripping the distributor unit by means of the gripping device during the exchange. In order to prevent the distributor unit from tilting about an axis when gripping from two opposite sides, said axis connecting the two engagement points of the gripper device, a support element may be provided at a distance from the actuation member on the housing of the actuation unit. The gripper device may be supported by this support element so that the torque about the axis can be absorbed between the engagement points by the support element and a part of the gripper device being in abutment with said support element.

Advantageous embodiments of the coolant distributor according to the invention can be inferred from the dependent claims as well as from the description. The description is restricted to essential features of the invention. The drawings are to be used for supplementary reference. Hereinafter, exemplary embodiments of the inventive coolant distributor will be explained with reference to the appended drawings. They show in

DETAILED DESCRIPTION

Figure 1:
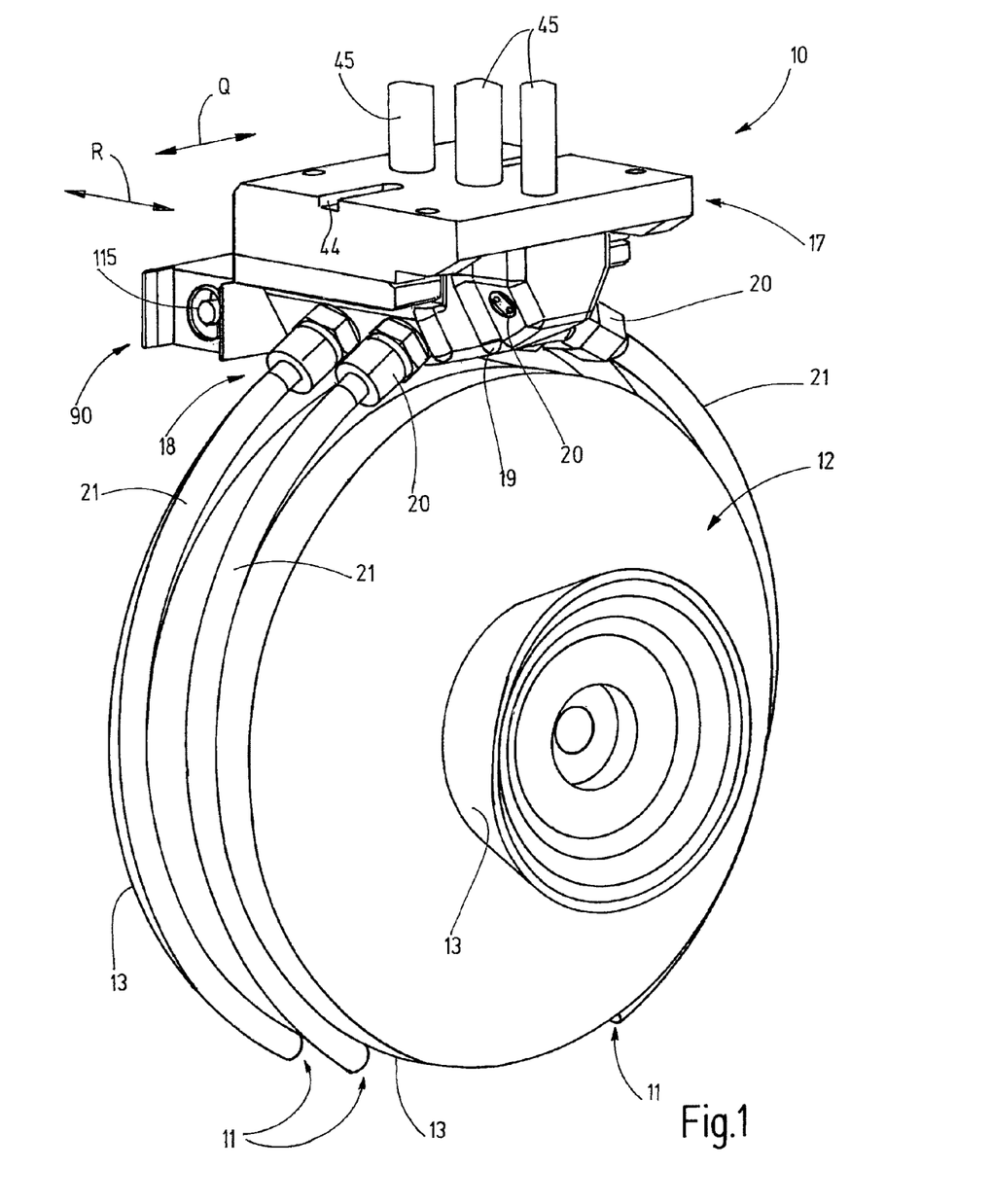
FIG. 1 a perspective view of an exemplary embodiment of a coolant distributor in operative position in a machine tool as well as the machining tool of the machine tool, configured as a grinding tool.

FIG. 1 shows an exemplary embodiment of a coolant distributor 10 for a machine tool and, in accordance with the example, a grinding machine. The coolant distributor 10 can also be used in other machine tools. It is disposed to convey pressurized coolant that is made available in the machine tool to sites 11 that are to be cooled. The sites 11 that are to be cooled are, in particular, sites at which a machining tool 12 of the machine tool can be brought into engagement with a workpiece that is to be processed. Referring to the example of FIG. 1, the machine tool 12 is a grinding tool that, in the present case, comprises several grinding disks 13. Therefore, the coolant is also conveyed, via the coolant distributor 10, to several sites 11 on the grinding disks 13.

Figure 2:
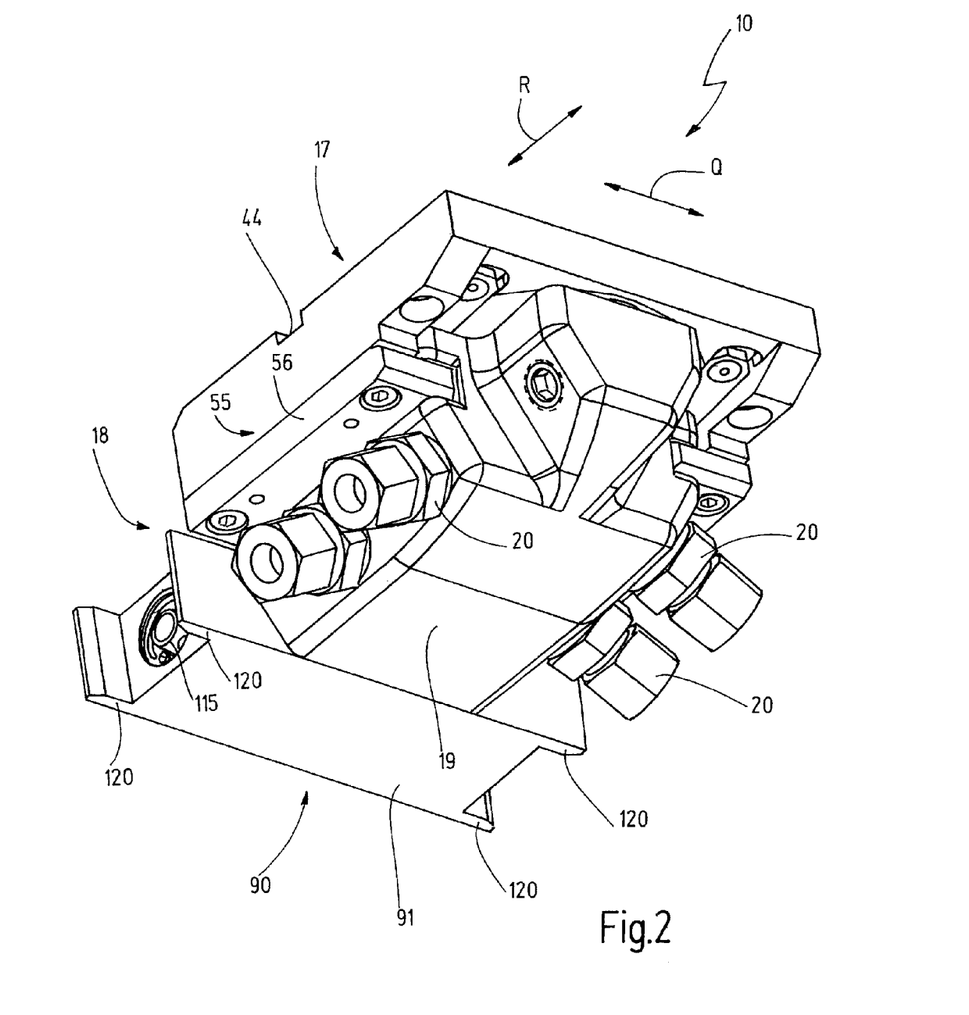
FIG. 2 a perspective view of the coolant distributor of FIG. 1.

The coolant distributor 10 comprises a connection unit 17 that is designed to be rigidly connected to the machine frame of the machine tool. Therefore, the connection unit 17 is stationarily arranged relative to the machine frame. Furthermore, the coolant distributor 10 comprises an exchangeable distributor unit 18 that is thus movable relative to the connection unit 17. The distributor unit 18 comprises distributor connectors 20 arranged on a distributor body 19 and being accessible from the outside, said distributor connectors being configured, for example, as plug connectors, bayonet connectors or screw connectors, or in another suitable manner. A pipe, a tube or another suitable coolant line 21 can be connected to the distributor connectors 20 in order to convey the coolant from the distributor connector 20 to the site 11 that is to be cooled. At the outlet end of the lines 21, there may be provided end fittings such as outlet nozzles of the like.

Referring to the exemplary embodiment described here, the distributor unit has six distributor connectors 20. The number of distributor connectors 20 is variable. The not-used distributor connectors 20 an be closed in a fluid-tight manner by blind plugging. Several of the provided distributor connectors 20 may be fluidically connected to each other.

Figure 6:
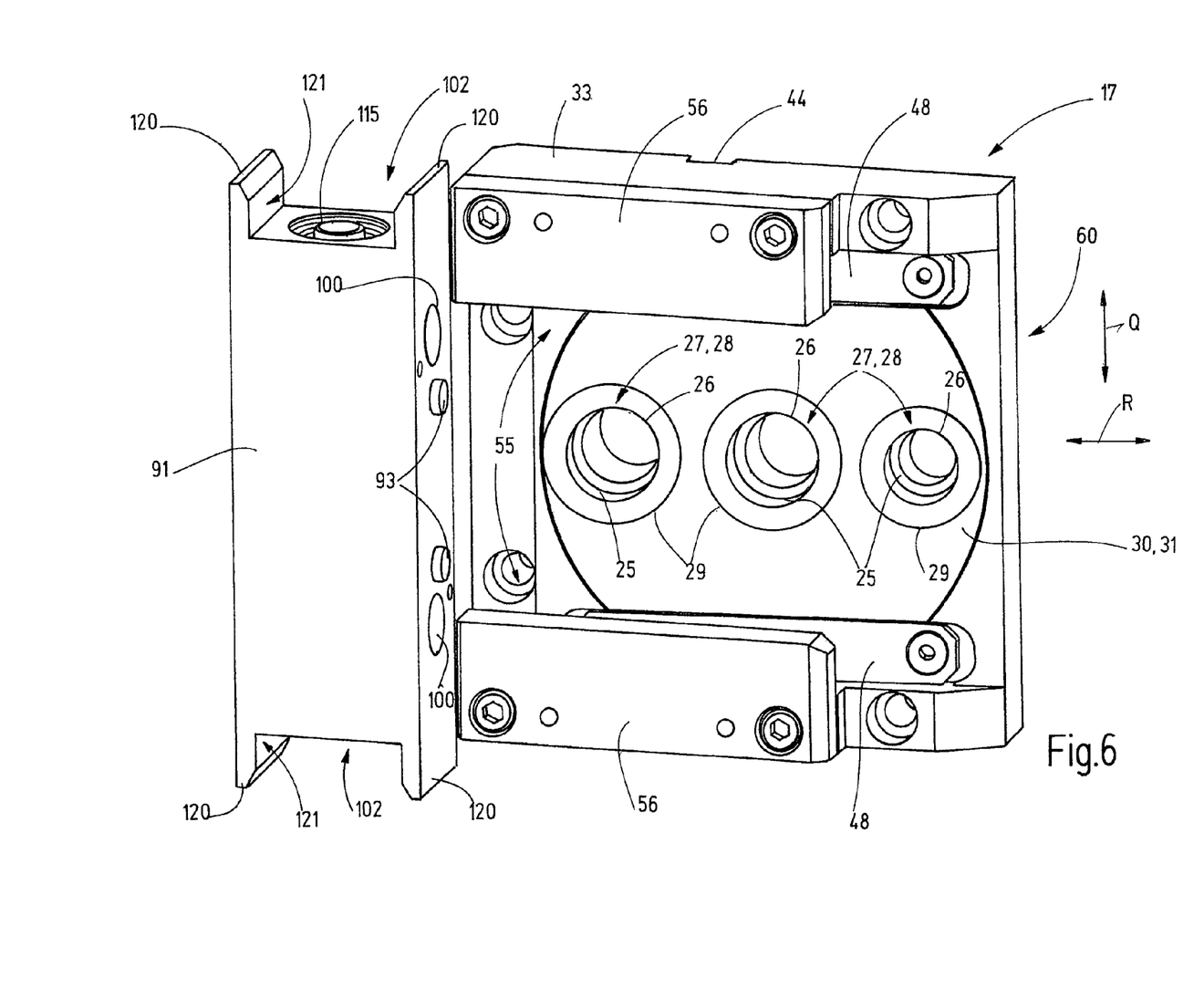
FIG. 6 a perspective view of a connection unit of the coolant distributor as in FIGS. 1 through 5, with a view of the connection face.

The connection unit 17 has one or more supply channels 25, as in the example. Each supply channel 25 terminates in a supply channel mouth 26 on a connection face 27. The connection face 27 extends in a plane E. In the exemplary embodiment described herein, the connection face 27 is divided into several spaced apart surface sections 28. Each surface section 28 is provided on an annularly closed sealing edge 29. A sealing edge 29 is provided around each supply channel mouth 26 and directly adjoins said sealing edge. The sealing edge 29 has a rectangular contour—viewed in cross-section. The three surface sections 28 of the sealing edges 29 are located in plane E and, together, form the connection face 27. In modification thereof, the connection face 27 can also be configured as a cohesive plane surface into which terminate the supply channels 25.

The connection face 27 and, as in the example, the sealing edges 29 are arranged, in the exemplary embodiment, on a connection body 30 of the connection unit 17, said connection body being configured in the shape of a plate as in the preferred exemplary embodiment and thus forming a connection plate 31. As shown in FIG. 6, the connection plate 31 may have a circular peripheral contour, for example. The connection plate 31 is supported in a recess 32 on a base body 33, said recess being adapted to the contour of the connection plate. At least one yielding element 35 is arranged between the connection plate 31 and the bottom 34 of the recess 32. In the exemplary embodiment the yielding element 35 consists of a plastic material such as, e.g., nitrile rubber or steel, and can usually elastically deform under pressure forces applied to the connection face 27 and the connection plate 31, respectively. In accordance with the example, each supply channel 25 is allocated one yielding element 35 that, in addition to generating an elastic mobility between the connection plate 31 and the base body 33, also is disposed to fluidically seal the connection site between the connection plate 31 and the base body 33. In doing so, the yielding element 35 is configured as the sealing element 36 in the form of a sealing ring or O-ring. The sealing element 36 is set in an annular groove 37 on the bottom 34 of the recess 32 of the base body 33. In non-deformed state, the sealing element 36 projects from the annular groove 37. The annular groove 37 is disposed to limit the deformation of the sealing element 36 and to support the sealing element 36 in a desired position.

Figure 3:
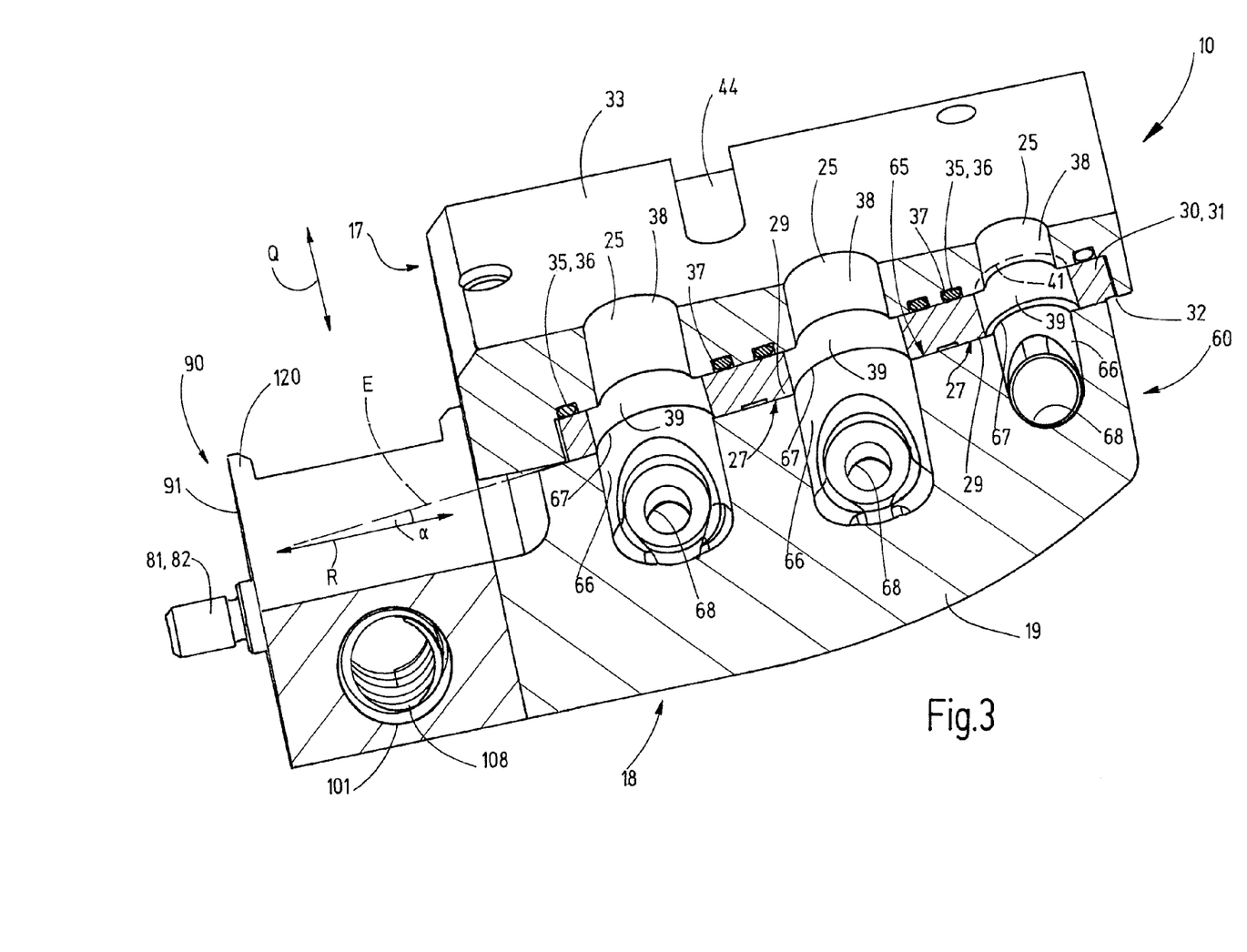
FIG. 3 a perspective sectional view of the coolant distributor as in FIGS. 1 and 2, in longitudinal section.

Each supply channel 25 extends through the base body 33, as well as through the connection plate 31. A first section 38 of each supply channel 25 extends inside the base body 33 and terminates on the bottom 34 of the recess 32. A second section 39 of each supply channel 25 extends through the connection plate 31 and extends between the supply channel mouth 26 on the connection face 27 and the interior side 40 of the connection plate 31 associated with the bottom 34 of the recess 32. Each of the two sections 38, 39 of the supply channel is cylindrical and they can be so as to be coaxial relative to each other.

In the exemplary example described here the diameter of the second section 39 extending in the connection plate 31 is greater than the diameter of the first section 38 of the supply channel 25. Consequently, an annular step 41 is formed at the connection site between the two section 28, 29. The provision of such an annular step 41 is optional. Such an annular step 41 may be provided on all O-rings or on only a part of the supply channels 25.

On the side opposite the connection face 27, each supply channel 25 is connected to a coolant tube 45. The coolant tubes 45 are connected to the base body 33 by material bonding, for example, by means of a welded connection. On its upper side, The base body 33 has runoff grooves 44, through which the coolant stagnating there, can flow down, for example.

Figure 4:
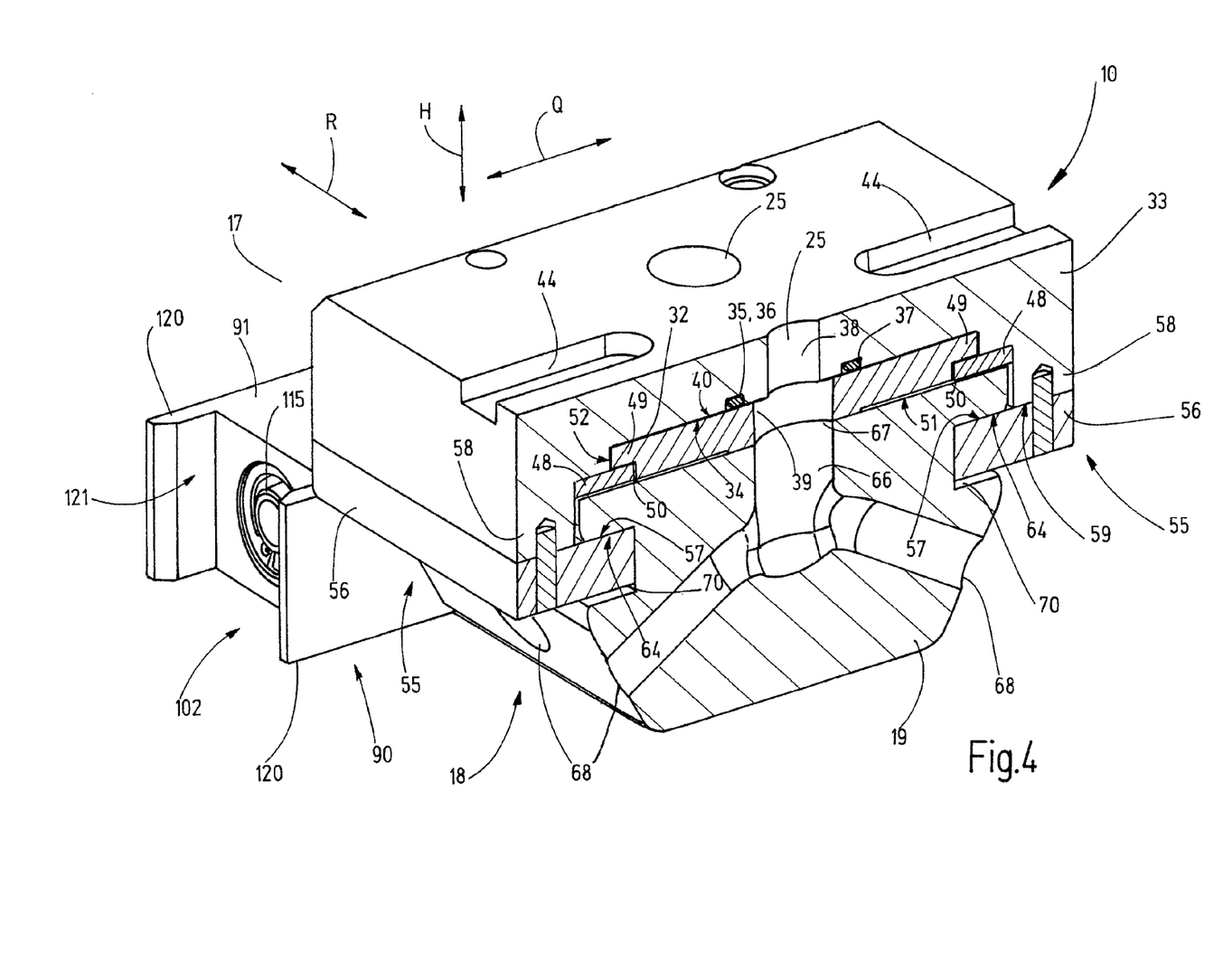
FIG. 4 a perspective sectional view of the coolant distributor as in FIGS. 1 through 3, in cross-section.

In order to hold the connection plate 31 in the recess 32 the connection unit 17 comprises a holding arrangement that, in the exemplary embodiment, is represented by several—for example two—holding brackets 48. The two holding brackets 48 are detachably connected to the base body 33, for example by means of a screw connection. As can be seen in FIGS. 4 and 6, the holding brackets 48 are provided on two opposite sides of the recess 32 at a distance from the bottom 34 of the recess. At least in some sections, the holding brackets 48 extend over the recess 32 as well as the holding sections 49 of the connection plate 31. The holding sections 49 of the connection plate 31 extending between the holding brackets 48 and the bottom 34 of the recess 32 are decreased regarding their thickness relative to the adjacent plate sections of the connection plate 31 by indentations 50. The indentations 50 are applied to the exterior side 51 of the connection plate 31, said exterior side being opposite the interior side 40. In a plan view of the exterior side, the indentation 50 has the contour of a segment of a circle. The indentation 50 is open toward the exterior side 51 as well as toward an edge 52 of the connection plate 31. The two holding brackets 48 that engage in respectively one indentation 50 thus fix the circular connection plate 31 in position so as to also prevent a rotation in the recess 32 of the base body 33.

By means of the difference of the thickness of the holding section 49 relative to the distance of the holding brackets 48 from the bottom 34 of the recess 32, the motion play of the connection plate 31 relative to the base body 33 can be prespecified. In doing so, the yielding elements 35 between the connection plate 32 and the base body 33 push the connection plate 31 away from the bottom 34 of the recess 32 and against the holding brackets 48. Consequently, the connection plate 31 is held securely in the recess 32 so that it cannot be lost and rotated and is supported, at the same time, so that it can be moved at a right angle to the connection face 27 relative to the base body 33.

A guide arrangement 55 is provided on the connection unit 17. The guide arrangement 55 is mounted to the base body 33. In the exemplary embodiment described here, the guide arrangement 55 comprises two guide rails 56 that extend parallel to each other and are detachably mounted to the base body 33, for example by means of a screw connection. In accordance with the example, the guide rails 56 have a rectangular cross-section and are preferably contoured so as to represent a parallelepiped. The guide rails 56 extend in a connection direction R. The two guide rails 56 are arranged at a distance from each other in a transverse direction Q, transversely to the connection direction R. The guide rails are made of a plastic material or metal, or a metal alloy, exhibiting good sliding properties, for example, brass or steel.

Each guide rail 56 has an abutment surface 57. The two abutment surfaces 57 extend on a common plane. In modification of the illustrated exemplary embodiment, the number of abutment surfaces 57 may also be greater or smaller. The abutment surfaces 57 extend in a plane that is delimited by the connection direction R and the transverse direction Q. The abutment surfaces 57 are inclined at an angle of inclination $\alpha$ relative to the plane E in which extends the connection face 27. The angle of inclination $\alpha$ is formed between the connection direction R and the plane E of the connection face 27.

The abutment surfaces 57 are arranged on the side of the guide rails 56 facing the base body and the connection plate 31, respectively. In the exemplary embodiment, the abutment surfaces 57 are located at a distance opposite the holding brackets 48. This is achieved in that the guide rails 56 are arranged on their respectively allocated base 58 of the base body that extends parallel to the respectively adjacent holding bracket 48. The two bases 58 extend parallel to each other in connection direction R. Each base 58 comprises a mounting surface 59 facing the associate guide rail 56, whereby the guide rail 56 is mounted to said mounting surface 59. The mounting surfaces 59 are arranged at a distance from the connection plate 31 and thus from the connection face 27, transversely with respect to the connection direction R and transversely to the transverse direction Q, in a height direction H. In the exemplary embodiment, the mounting surfaces 59 are configured as plane surfaces and extend—viewed in connection direction R—at an angle of inclination $\alpha$ relative to the plane E in which extends the connection face 27. Consequently, because of the bases 58, the abutment surface 58 of the respectively associate guide rail 56 is also inclined at the angle of inclination $\alpha$ relative to the connection face 27. Viewed in connection direction R, the distance between the two abutment surfaces 57 decreases uniformly, starting from an insertion side 60 on the connection unit 17.

The base body 33 and/or the connection body 30 represented by the connection plate 31 may be made of metal, for example steel or copper, or of a metal alloy such as brass.

The exchangeable distributor unit 55 can be connected to the connection unit 17 by means of the guide arrangement 55. A counter-abutment surface 64 provided for each abutment surface 57 is provided on the distributor unit 18 and, in the exemplary embodiment, on the distributor body 19. With the connection established, the counter-abutment surfaces 64 abut against their respectively associate abutment surface 57.

Figure 5:
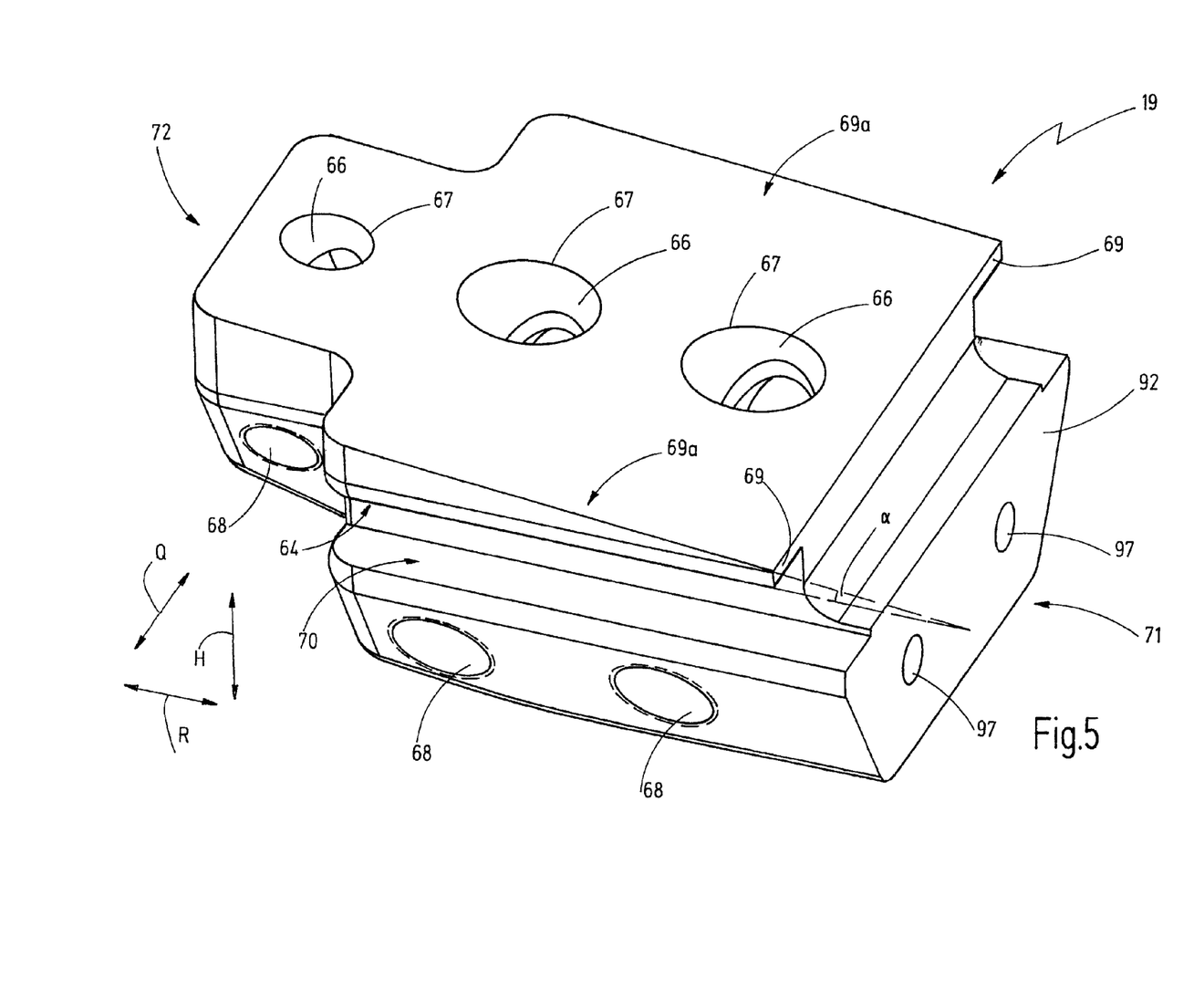
FIG. 5 a perspective view of a distributor body of a distributor unit of the coolant distributor as in FIGS. 1 through 4.

Furthermore, the distributor unit 18 comprises a distributor face 65 that, in the exemplary embodiment, is configured as a cohesive plane surface and, in accordance with the example is provided on the distributor body 19 (FIG. 5). Alternatively to the exemplary embodiment shown here, the distributor face 65 could also be provided on a separate body, for example a plate that is detachably connected to the distributor body 19. In FIG. 5, this is indicated only schematically by means of a chain line. Such an exchangeable plate could be replaced very easily in case of wear of the distributor face 65.

In the exemplary embodiment, the distributor body 19 consists of aluminum in order to keep the moved mass minimal. Said body could also be made of a plastic material. If the distributor face is provided on a separate plate of the distributor unit 18, this plate may be made of another material that has been optimized regarding its sliding properties such as steel, copper or a metal alloy, e.g., brass. The distributor body 19 may be produced as a cast part.

The distributor body 19 contains several, for example three, distributor channels 66, in which case each distributor channel 66 comprises a distributor channel mouth 67 in the distributor face 65. The distributor channel mouths 67 are arranged in such a manner that, with the connection between the distributor unit 18 and the connection unit 17 established, they are fluidically connected with respectively one supply channel 25. The diameter of the distributor channels 66 on the distributor channel mouth 67 may correspond to the diameter of the supply channel mouth 26 on the connection face 27. In order to compensate for certain deviations at the time when the connection is established between the two units 17, 18, it is also possible, alternatively, to select the diameters to also have different dimensions, in which case the diameter of one or more of the distributor mouths 67, in accordance with the example, is smaller than the diameter of the supply channel mouth 26 on the connection face 27. The distributor channel mouths 67, in accordance with the example, are arranged in a row in connection direction R.

Each distributor channel 66 is fluidically connected to one outlet opening 68 on the distributor body 19. Respectively one distributor connector 20 is inserted into the outlet openings 68. In the exemplary embodiment, two or three outlet openings 68 are fluidically connected to one distributor channel 66. In view of the flow, the distributor channels 66 are configured in such a manner that each of all the outlet openings 68 being in fluidic connection with one distributor channel each has approximately the same size.

As is shown by FIG. 5, the two counter-abutment surfaces 64 are inclined in connection direction R by the angle of inclination $\alpha$ relative to the distributor surface 65. The counter-abutment surfaces 64 are provided on two lateral projections 69 that extend in transverse direction Q away from the part of the distributor body 19 having the distributor face 65. The thickness of the two lateral projections 69 in height direction H transversely to connection direction R and transversely to transverse direction A is not constant but decreases—viewed from one rear side 72 of the distributor body 19—in connection direction R. The counter-abutment surfaces 64 are oriented away from the distributor face 65. In accordance with the example, the rear sides 69a of the two lateral projections 69 opposite the counter-abutment surfaces 64 terminate without steps and edges in the distributor face 65 and may be an integral part of the distributor surface 65.

Adjoining the counter-abutment surface 64, adjacent to the respective lateral projection 69, there is a longitudinal recess 70 extending continuously in connection direction R in the distributor body 19. With the connection established, respectively one associate guide rail 56 can engage in the connection unit 17 in each longitudinal recess 70 so that the abutment surface 57 and the counter-abutment surface 64 can come into contact with each other. Viewed in cross-section transversely to the connection direction R, the two longitudinal recesses 70 form, as it were, a lateral groove in the distributor body 19, said lateral groove being open in transverse direction Q.

Viewed in connection direction R, the distributor body 19 has a front side 71 and a rear side 72. In connection direction R, the distance between the distributor face 65 and the two counter-abutment surfaces 64 decreases toward the front side 71 and increases toward the rear side 72.

In order to connect the distributor unit 18 to the connection unit 17 the distributor unit 18 is plugged, with the front side 71 of the distributor body 19 ahead, from the direction of the insertion side 60, between the two guide rails 56, in which case the two abutment surfaces 57 slide on the guide rails 56 next to each other with the counter-abutment surfaces 64 of the distributor body 19. With the continued movement the distance between the distributor face 65 and the connection face 27 decreases until the two surfaces 27, 65 are in abutment with each other, as a result of which also a fluidic connection of the supply channels with the respectively associate distributor channel 66 is established via the respective supply channel mouth 26 and the distributor channel mouth 67. By applying a force to the distributor unit 18 in connection direction R from the rear side 72 to the front side 71, a depressing force or pressing force is also applied between the distributor face 65 and the connection face 27 is achieved, and thus a fluid-tight connection is achieved. The yielding elements 35 and the sealing elements 36, respectively, between the connection plate 31 and the base body 33 of the connection unit are elastically deformed due to this pressing force, so that the connection plate 31 moves—due to a prespecified movement play, somewhat further into the recess 32 on the base body 33. Even with the connection established, the plane E in which the connection face 27 extends, is located outside the recess 32. As a result of this it is ensured that the distributor face 65 abuts only against the connection face 27 and that a sufficiently great pressing force for a fluid-tight connection results.

The coolant distributor 10 comprises a locking device 80 that, with the connection established between the distributor unit 18 and the connection unit 18, is disposed to prevent a relative movement between said units 17, 18. With the connection established, the pressure prevailing between the connection face 27 and the distributor face 65 is thus maintained.

Figure 7:
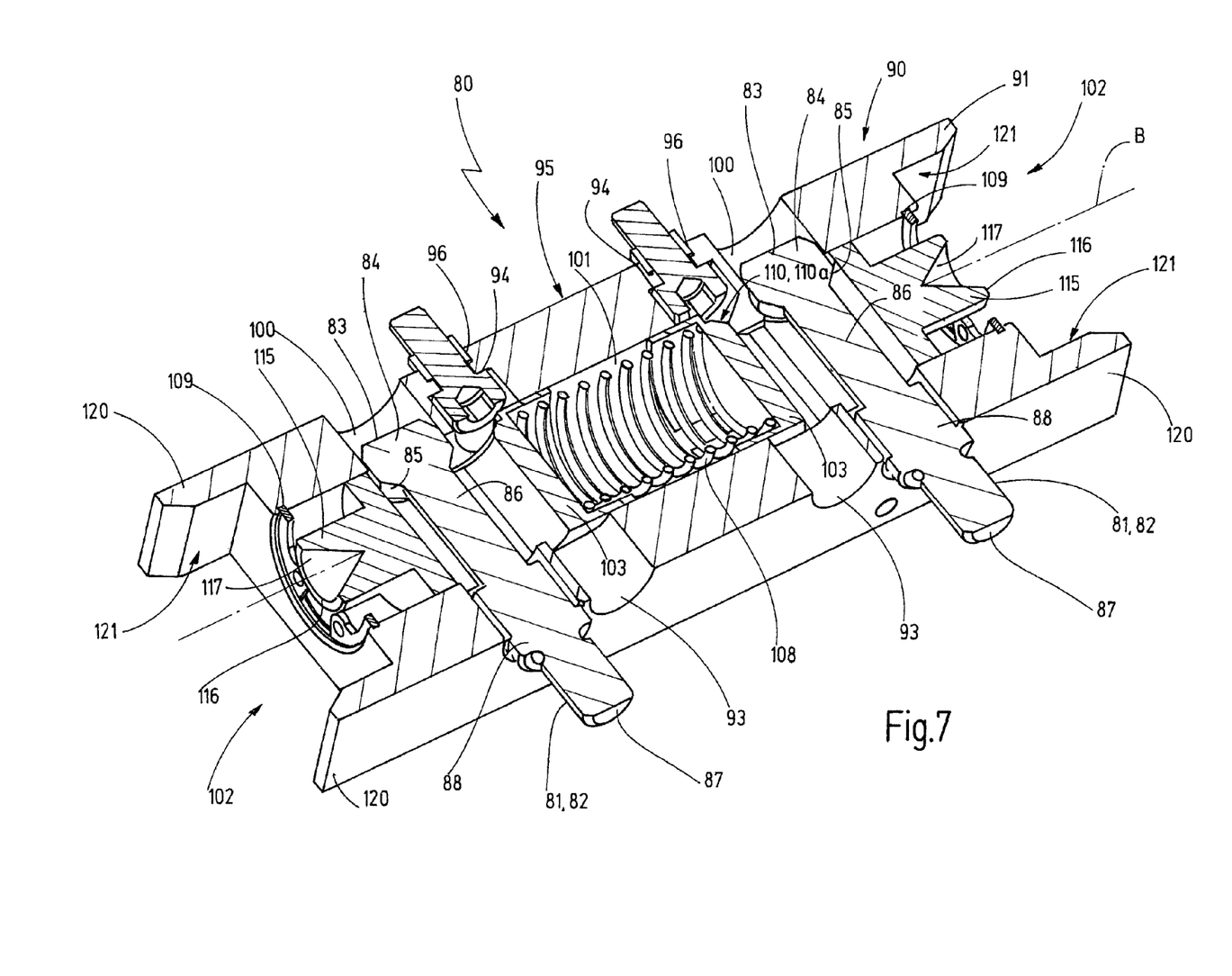
FIG. 7 a perspective view, in longitudinal section through an exemplary embodiment of a locking device.
Figure 8:
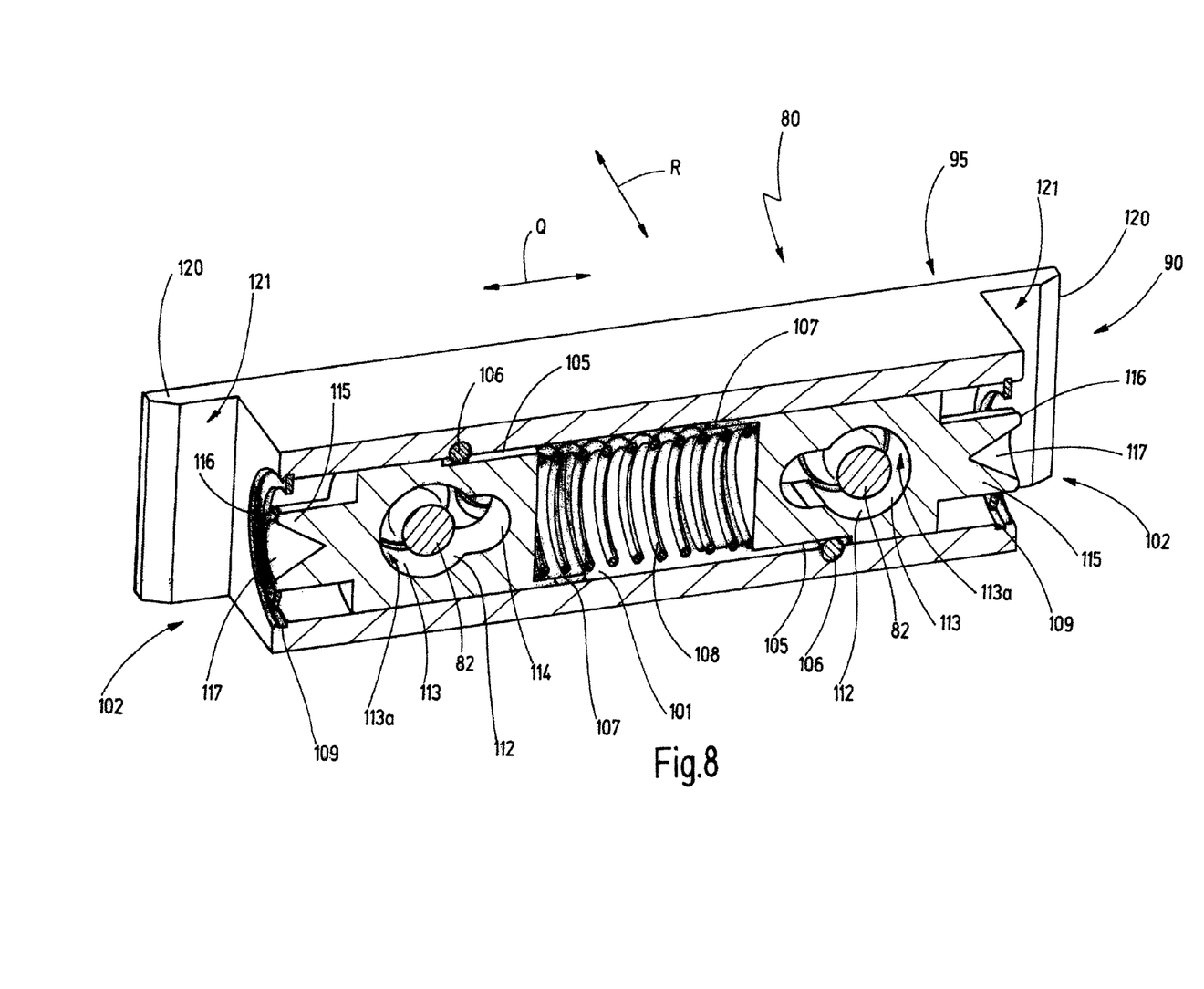
FIG. 8 a perspective sectional view of the locking device as in FIG. 7, in another longitudinal section.
Figure 9:
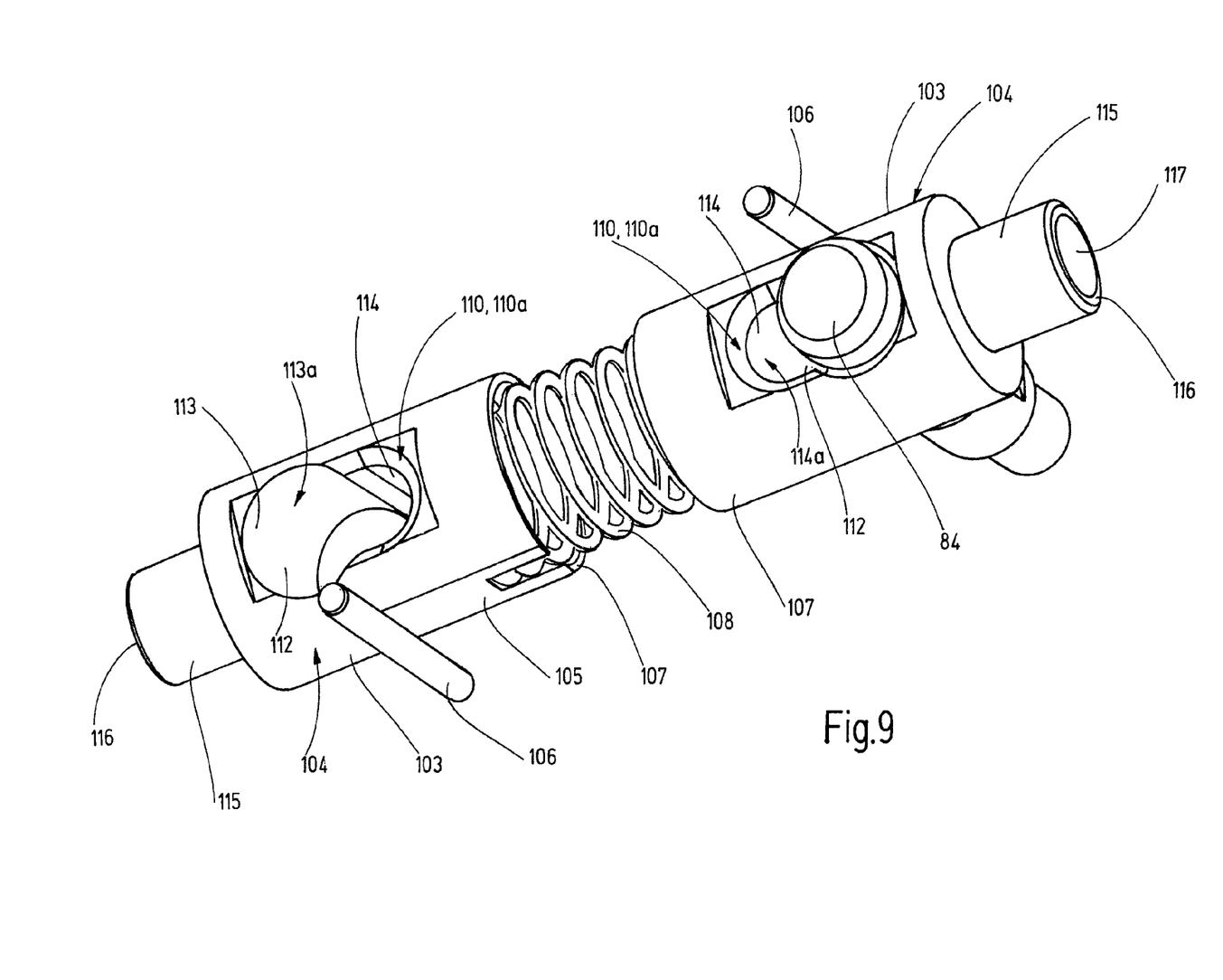
FIG. 9 a perspective view of the locking elements, the associate actuation elements, a pretensioning element as well as an anti-rotation lock of the locking device as in FIGS. 7 and 8.

FIGS. 7 through 9 show the locking device 80, for example. The locking device 80 comprises at least on holding body 81 arranged on the machine frame or on the connection unit 17. In the exemplary embodiment, two such holding bodies 81 in the form of holding pins 82 are provided, each of these being oriented on the respective longitudinal axis in connection direction R. One axial fastening end 87 of the two holding pins 82 is fastened to the machine frame, for example by screw connection, while the free end 83 on the opposite side comprises a head piece 84. In accordance with the example, the head piece 84 has a conical holding surface 85 that is provided on the side of the head piece 84 opposite the free end 83. The holding surface 85 encloses the head piece 84 coaxially with respect to the longitudinal axis of the holding pin 82. The normal vector of the holding surface 85 is inclined relative to the longitudinal axis of the holding pin 82, for example at an acute angle, and, in the exemplary embodiment, at an angle of approximately 45°.

Adjoining the head piece 84 and the holding surface 85, respectively, the holding pin 82 has a central section 86 having a diameter that is smaller than the maximum diameter of the head piece 84. Toward its fastening end 87, the holding pin 82 may have a centering section 88 adjoining the centering section 86, the diameter of the centering section 88 being greater than that of the centering section 86. The centering section 88 is optional.

Furthermore, the locking device 80 comprises an actuation unit 90 having a housing 91. The actuation unit 90 can be mounted, by means of its housing 91, to a mounting surface 92 of the distributor body 19, on the front side 71 of said distributor body 19. Mounting may be accomplished by means of a screw connection. In addition, centering sleeves may be interposed between the housing 91 and the distributor body 19.

In order to accomplish this screw connection, the housing 91 in accordance with the example has two passage holes that extend completely through the housing 91. Each passage hole has an annular shoulder 94 for the abutment of the screw head. On an exterior surface 95, in axial direction at a distance from the annular shoulder 94 and adjacent to the mounting surface 92, there is a cylindrical expansion 96 into which a centering sleeve can be inserted. The remaining section of the centering sleeve is inserted in a corresponding cylindrical expansion that is provided in the connection holes 97 of the mounting surface 92. The through bores 93 extend in connection direction R.

Furthermore, insertion openings 100 extend through the housing 91, said openings extending in connection direction R and thus, in accordance with the example, extending parallel to the through bores 93. The two through bores 93 are arranged in transverse direction Q between the insertion openings 100. The inside diameter of the insertion openings 100 corresponds to the outside diameter of the widest point of the holding pin 82 and thus to the outside diameter of the head piece 84 and the centering section 88. The insertion opening 100 has a cylindrical contour. It completely extends through the housing 91. Each holding pin 82 is associated with an insertion opening 100. The distance of the insertion openings 100 in the housing 91 corresponds to the distance of the holding pins 84, viewed in transverse direction Q.

In transverse direction Q, a receiving opening 101 extends completely through the housing 91. In the exemplary embodiment, the receiving opening 101 has a cylindrical contour. Viewed in transverse direction Q, said receiving opening terminates on an actuation side on the housing. Arranged in the receiving opening 101 are at least one locking element 103 and, according to the example, two locking elements 103, that can be moved in transverse direction Q. One locking element 103 is associated with each provided holding body 81. Each locking element 103 has a locking surface 110 that—in locked position—abuts against the associated holding surface 85 of the holding body 81 and is positioned, in the unlocked position in accordance with the example, in transverse direction Q at a distance from the holding surface 85.

The peripheral surface of the locking element 103 has, at least in sections, a cylindrical contour so that it can be moved back and forth in the cylindrical receiving opening 101. In order to avoid a twisting of the locking element 103 about its longitudinal axis, the exterior surface 104 of the locking element 103 is provided at one point with a locking surface 105. In the region of the locking surface 105, the exterior surface 104 deviates from the cylindrical form. Preferably, the locking surface 105 has the shape of a flat surface. One locking member 106, for example a cylindrical pin, abuts against the locking surface 105 in a planar or a linear manner. To do so, the locking member 106 is inserted into a corresponding recess in the housing wall of the housing 91, adjacent to the locking surface 105. The pin-shaped locking member 106, in accordance with the example, extends parallel to the insertion openings 100. In transverse direction Q, the locking surface 105 is sufficiently wide so as to not impair a shifting due to the locking element 103 in transverse direction Q by the locking member 106.

On the interior end section 107, the locking element 103 has the shape of a hollow cylinder. This hollow-cylindrical end section 107 is disposed for receiving an associate end region of a pretensioning element 108 that pretensions the locking element 103 in its locked position. The pretensioning element 108 is a helical spring, for example. In the example described here, a shared pretensioning element 108 is allocated in both locking elements 103. The pretensioning element 108 in the form of the helical spring, as well as the two locking elements 103, are arranged along a joint axis in the cylindrical receiving opening 101. In the two axial end regions of the receiving opening 101, adjoining an actuation side 102 in a locking groove 109, a not illustrated locking ring is arranged, which ring may be configured as a snap ring. As a result of this, the locking elements 103 and the pretensioning element 108 are supported in the receiving opening 101 so as to be secured against loss.

In extension direction of the insertion opening 100, each locking element 103 is completely open in the form of a locking opening 112 that adjoins the locking face 110. The locking opening 112 has a first opening section 113 that is partially cylindrical and has a larger diameter and a second opening section 114 that is partially cylindrical and has a smaller diameter. The two opening sections 113, 114 are formed by parallel cylindrical openings that overlap in radial direction. Therefore, the cross-section of the locking opening 112 has a keyhole-like contour. Each of the two opening sections 113, 114 has a peripheral wall 113a and 114a, respectively, located on a cylindrical circumferential surface, whereby, however, said peripheral wall need not be completely closed in a ring-shaped manner but adjoins the respectively other peripheral wall 114a and 113a, respectively, of the other opening section 114 and 113, respectively.

The second opening section 114 having the smaller diameter has a bezel 110a on its axial end. The bezel 110a has the form of a section of a circumferential surface of a truncated cone. Its angle of inclination relative to the longitudinal axis of the cylindrical circumferential surface on which the peripheral wall of the second opening section 114 is located corresponds to the angle that is assumed by the holding surface 85 relative to the longitudinal axis of the holding pin 82. In the exemplary embodiment, the bezel 110a abuts against the locking surface 110.

The diameter of the first opening section 113 corresponds to the maximum diameter of the head piece 84 of the holding pin 82. In accordance with the example, the insertion opening 100 has the same diameter.

The locking element 103 can be moved transversely to the extension direction of the insertion openings 100, i.e., in operative position of the distributor unit 18 in transverse direction Q, so that, in the unlocked position, the longitudinal axis of the holding pin 82 corresponds to the longitudinal axis of the first opening section 113, so that the holding pin 82 can be plugged into the locking element 103 or pulled out of the locking element 103. As opposed to this, the longitudinal axis of the second opening section 114 is arranged in the region of the longitudinal axis of the holding pin 82 in locked position, as a result of which the conical surface 85 of the head piece 84 abuts against the bezel 100a of the locking element 103. Due to the pretensioning force of the pretensioning element 108, the bezel 110a is pressed against the holding surface 85 so that the head piece 84 cannot be pulled out of the insertion opening 100. In this locked position, the head piece 84, as well as the centering section 88 of the holding pin 88, abut against the interior surface of the insertion opening 100.

For switching the locking elements 103 between the locked position and the unlocked position each locking element 103 is allocated an actuation element 115. The actuation elements 115 project on a respectively associate actuation side 102 from the receiving opening 101 and thus from the housing 91. In the exemplary embodiment, the actuation elements 115 have a cylindrical contour and are arranged coaxially relative to the locking element 103. Preferably, the actuation element 115 is a component designed without seams and joints in a single piece with the locking element 103.

An engagement opening 117 is provided extending from its free end 116 into the actuation element 115, said engagement opening having the shape of a circular cone, for example. The actuation elements 115 and the engagement openings 117 of the two actuation elements 115 are aligned along a joint actuation axis B, wherein the actuation axis B in the described example corresponds to the longitudinal axis of the cylindrical receiving opening 101.

The distributor unit 18 can be gripped and moved by a gripper device. In doing so, the locking device 80 is brought into its unlocked state at the same time in that the locking elements 103 assume their unlocked position. Inasmuch as the two actuation elements 115 are arranged along the joint actuation axis B, it is possible—when the distributor unit 18 is being gripped—for an overturning moment about the actuation axis B to be generated through a point of gravity of the distributor unit 18, said point of gravity being offset relative to the actuation axis B, and/or for the tool to be moved together with the distributor unit 18. In order to avoid such tilting and an undefined orientation of the distributor unit 18 during the transport by the gripper device, in accordance with the example, both actuation sides 102 are provided with at least one support element 120 that provides a support surface 121 for the gripper device. In the exemplary embodiment, two support elements 120 are provided at a distance from each other on each actuation side 102. According to the example, each of these is a support flange on which the support surface 121 is arranged on the side facing the control element 15. Consequently, the control element 115 is arranged essentially in the center between two support flanges or support surfaces 121. The at least one support element 120 thus acts as a guard against tilting or twisting for the distributor unit 18 when the machine tool is handled with a gripper device.

With the connection established between the connection unit 17 and the distributor unit 18, the two holding pins 82 engage in the insertion openings 100, and the locking surfaces 110 of the two locking elements 103 abut against the respectively associate holding surface 85 of the respective holding body 81, as a result of which a pulling force is exerted on the distributor unit 18 in connection direction R, said force being converted into a pressing force between the distributor surface 65 and the connection face 27. In this locked state, a movement of the distributor unit 18 relative to the connection unit 17 is prevented.

In order to separate the distributor unit 18 from the connection unit 17, said distributor unit is gripped by a gripper device from the direction of the two actuation sides 102 on the actuation unit 90 and, in accordance with the example, gripped on the actuation elements 115, as a result of which these are pressed onto each other and thus the respectively associate locking element 113 is brought into its unlocked position. The gripper device can then move the entire distributor unit 18 in connection direction R, whereby the holding pins 82 are moved out of the insertion openings 100. The connection between the connection unit 17 and the distributor unit 18 is accomplished analogously with a movement into the opposite direction.

The invention relates to a coolant distributor 10, comprising a connection unit 17 installed so as to not be movable relative to the machine frame and comprising an exchangeable distributor unit 18. The distributor unit 18 can be connected to the connection unit 17 or disconnected from the connection unit 17 by means of a gripper device associated with the machine tool. The connection unit 17 has a connection face 27, on which at least one supply channel 25 for coolant opens. For abutment with the connection face 27, there is a distributor face 65 on the distributor unit 18, on which distributor face at least one distributor channel 66 opens. The plane in which the connection face 27 extends, as well as the plane in which the distributor face 65, are inclined opposite a connection direction R in which the distributor unit 18 is moved for establishing and separating the connection. A holding force can be applied to the distributor unit 18 in connection direction R by means of a locking device 80 in order to hold the distributor unit 18 in the position in which the distributor unit 18 is connected to the connection unit 17 with a prespecified pressing force between the connection face 27 and the distributor face 65. As a result of this, a fluid-tight connection between the at least one supply channel 25 and the respectively associated distributor channel 66 is achieved, said connection being easily established and easily separated.

LIST OF REFERENCE SIGNS

- 10 Coolant distributor
- 11 Sites to be cooled
- 12 Machining tool
- 13 Grinding disk
- 15 Control element
- 17 Connection unit
- 18 Distributor unit
- 19 Distributor body
- 20 Distributor connector
- 21 Line
- 25 Supply channel
- 26 Supply channel mouth
- 27 Connection face
- 28 Surface section of the connection face
- 29 Sealing edge
- 30 Connection body
- 31 Connection plate
- 32 Recess
- 33 Base body
- 34 Bottom of the recess
- 35 Yielding element
- 36 Sealing element
- 37 Annular groove
- 38 First section of the supply channel
- 39 Second section of the supply channel
- 40 Interior side of the connection plate
- 41 Annular step
- 44 Run-off groove
- 45 Coolant tube
- 48 Holding bracket
- 49 Holding section
- 50 Indentation
- 51 Exterior side of the connection plate
- 55 Guide arrangement
- 56 Guide rail
- 57 Abutment surface
- 58 Base
- 59 Mounting surface
- 60 Insertion side
- 64 Counter-abutment surface
- 65 Distributor face
- 66 Distributor channel
- 67 Distributor channel mouth
- 68 Outlet opening
- 69 Lateral projection
- 70 Longitudinal recess
- 71 Front side of the distributor body
- 72 Rear side of the distributor body
- 80 Locking device
- 81 Holding body
- 82 Holding pin
- 83 Free end of the holding pin
- 84 Head piece
- 85 Holding surface
- 86 Central section
- 87 Fastening end
- 88 Centering section
- 90 Actuation unit
- 91 Housing
- 92 Mounting surface
- 93 Through bore
- 94 Annular shoulder
- 95 Exterior surface of the housing
- 96 Expansion
- 97 Connection hole
- 100 Insertion opening
- 101 Receiving opening
- 102 Actuation side
- 103 Locking element
- 104 Exterior surface
- 105 Flat region
- 106 Locking member
- 107 Interior end section
- 108 Pretensioning element
- 109 Locking ring
- 110 Locking face
- 110a Bezel
- 112 Locking opening
- 113 First opening section
- 113a Peripheral wall of the first opening section
- 114 Second opening section
- 114a Peripheral wall of the second opening section
- 115 Actuation element
- 116 Free end of the actuation element
- 117 Engagement opening
- 120 Support element
- B Actuation axis
- H Height direction
- Q Transverse direction
- R Connection direction

The invention claimed is:

1. Coolant distributor (10) for a machine tool, comprising
a connection unit (17) disposed for being fastened to the machine frame, said connection unit having a connection face (27) on which at least one supply channel (25) for the coolant opens;
a guide arrangement (55) provided on the connection unit (17), said guide arrangement having at least one abutment surface (57) inclined at an angle of inclination ($\alpha$) relative to the connection face (27);
a distributor unit (18) having a distributor face (65) on which at least one distributor channel (66) opens and having at least one counter-abutment surface (64) associated with the abutment surface (57), said counter-abutment surface being inclined at the angle of inclination ($\alpha$) relative to the distributor face (65);
wherein the distributor unit (18) is configured to be moveable in a connection direction (R) parallel to the abutment surface (57) relative to the connection unit (17) in order to establish or separate a connection between the distributor unit (18) and the connection unit (17); and
wherein, with the connection between the distributor unit (18) and the connection unit (17) established, the counter-abutment surface (64) abutting against the abutment surface (57) presses the distributor face (65) against the connection face (27).

2. Coolant distributor (10) as in claim 1,
wherein the connection unit (17) comprises a base body (33) and a connection body (30) that is slidably arranged on the base body (33), in which case the connection body (30) has the connection face (27) on the side facing away from the base body (33), and in which case at least one yielding element (35) is interposed between the base body (33) and the connection body (30).

3. Coolant distributor (10) as in claim 2,
wherein the at least one yielding element (35) is used as the sealing element (36) for the fluid-tight connection between the section (38) extending in the base body (33) and the section (39) of the supply channel (25) extending in the connection body (30).

4. Coolant distributor (10) as in claim 2,
wherein an annular step (41) is formed on the connection body (30) between the section (38) extending in the base body (33) and the section (39) of the supply channel (25) extending in the connection body (30).

5. Coolant distributor (10) as in claim 1, wherein the guide arrangement (55) comprises two guide rails (56) extending parallel to each other in connection direction (R), said guide rails being arranged on opposite sides of the connection face (27).

6. Coolant distributor (10) as in claim 5,
wherein each guide rail (56) has an abutment surface (57) facing the connection face (27), in which case the distance between the abutment surfaces (57) and the connection face (27) decreases from the insertion side (60) in connection direction (R).

7. Coolant distributor (10) as in claim 5,
wherein the guide rails (56) are detachably arranged on the respectively associate base (58) of the connection unit (17).

8. Coolant distributor (10) as in claim 1,
wherein the connection face (27) is provided on at least one annularly closed sealing edge (29) that encloses respectively one associate mouth (26) of the supply channel (25).

9. Coolant distributor (10) as in claim 1,
wherein a locking device (80) is provided which, in its locked state, prevents a movement of the distributor unit (18) relative to the connection unit (17).

10. Coolant distributor (10) as in claim 9,
wherein the locking device (80) comprises an actuation unit (90) fastened to the connection unit (17), said actuation device comprising at least one locking element (103) that is slidably supported between a locked position and an unlocked position.

11. Coolant distributor (10) as in claim 10,
wherein the at least one locking element (103) is subjected to a pretensioning force of a pretensioning element (108) for holding the locking element (103) in the locked position or for moving said locking element into the locked position.

12. Coolant distributor (10) as in claim 10,
wherein the at least one locking element (103) comprises an actuation member (115) that projects from a housing (91) of the actuation unit (90).

13. Coolant distributor (10) as in claim 12,
wherein two locking elements (103) are provided and that the actuation members (115) project on opposite sides (102) of the housing (91) of the actuation unit (90).

14. Coolant distributor (10) as in claim 12, the actuation member (115) is configured to grip the distributor unit (18) using a gripper device.

15. Coolant distributor (10) as in claim 14,
wherein, adjacent to and at a distance from the actuation member (115) on the housing (91) of the actuation unit (90), there is provided a support element (120) configured to support the gripper device when gripping the distributor unit (18).

* * * * *